(12) United States Patent
Ozawa et al.

(10) Patent No.: US 6,548,585 B1
(45) Date of Patent: Apr. 15, 2003

(54) RUBBER COMPOSITION FOR HOSE PRODUCTION, HOSE, AND PROCESS FOR PRODUCING REFRIGERANT HOSE

(75) Inventors: Osamu Ozawa, Kanagawa (JP); Tomoji Saitoh, Kanagawa (JP); Hiroaki Shibano, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/288,972

(22) Filed: Apr. 9, 1999

(30) Foreign Application Priority Data

Apr. 14, 1998  (JP) .............................. 10-102579
Jul. 31, 1998  (JP) .............................. 10-217128

(51) Int. Cl.$^7$ .............................. D02G 3/00
(52) U.S. Cl. ................ 524/432; 524/451; 428/398; 138/141
(58) Field of Search ................ 524/432, 451; 428/398; 138/141

(56) References Cited

U.S. PATENT DOCUMENTS 5,246,778 A     9/1993  Costemalle et al. ........ 428/398
5,332,787 A  *  7/1994  Gardner ........................ 525/134

FOREIGN PATENT DOCUMENTS

| JP | 7-116339 | 12/1995 |
| WO | WO 91/18050 | * 11/1991 |
| WO | WO 92/16587 | 10/1992 |

* cited by examiner

Primary Examiner—Peter D. Mulcahy
(74) Attorney, Agent, or Firm—Finnegan, Henderson, Farabow, Garrett & Dunner LLP (57) ABSTRACT

Rubber compositions for hose production having excellent scorch resistance, extrudability, moisture impermeability, weatherability (ozone resistance), and compression set resistance, as well as a hose produced therefrom, and in particular, a refrigerant hose and its production process are provided. More illustratively, a composition comprising (A) a brominated copolymer of an isomonoolefin and a p-alkylstyrene (PMS) wherein PMS content, bromine (Br) content, and Br/PMS weight ratio are within particular ranges; (B) zinc white; and (C) a brominated alkylphenol resin, and a hose wherein such composition is used for the inner tube and/or the outer cover are provided. Also provided are a composition comprising (A) the brominated copolymer rubber and (D) an inorganic laminar compound; a hose produced by using such composition for the inner tube; and a process for producing a refrigerant hose from such a composition by in-die drawing process.

3 Claims, 4 Drawing Sheets

♦ INCLUDING BROMINATED ALKYLPHENOL RESIN
● EXCLUDING BROMINATED ALKYLPHENOL RESIN

RUBBER COMPOSITION FOR HOSE PRODUCTION, HOSE, AND PROCESS FOR PRODUCING REFRIGERANT HOSE

BACKGROUND OF THE INVENTION

This invention relates to a rubber composition adapted for use as a material in producing hoses such as refrigerant hose, radiator hose, hot water hose, steam hose and other hoses; a hose having an inner tube and/or an outer cover comprising such rubber composition; and a process for producing a refrigerant hose having an inner tube comprising such rubber composition.

Rubbers such as EPDM and IIR have been used for the rubber components of the rubber composition for refrigerant hose, radiator hose, hot water hose, steam hose and other hoses. More recently, a halogenated copolymer of an isomonoolefin and a p-alkylstyrene (hereinafter referred to as BIMS) have been used since BIMS has been found to satisfy both the moisture impermeability and weatherability (ozone resistance). For example, Japanese PCT Publication A 6-506013 discloses a composition for mold curing elements containing a BIMS, a filler, a process oil, and a curing agent; and Japanese PCT Publication A 8-500385 discloses a rubber composition comprising a BIMS containing at least 5% by weight of a p-alkylstyrene and at least about 0.4% by mole of a halogen, a filler, a rubber additive, and a curing agent.

JP-B 7-116339 discloses that a rubber composition primarily adapted for producing a hose which comprises a BIMS having a particular ratio of the Br content to the p-alkylstyrene content and zinc salt of a fatty acid as a vulcanization aid exhibits good adhesion with fibers. JP-A 9-124848 discloses an elastomer composition containing a BIMS and a thermoplastic resin, and more particularly, a thermoplastic elastomer composition adapted for producing a hose of reduced permeability comprising resin components including a BIMS of a particular p-alkylstyrene content and a particular halogen content and a thermoplastic resin, and wherein at least a part of the resin components constitutes continuous phase and at least a part of the resin components constitutes dispersed phase.

In the use of such a hose, the hose is connected to the particular system by coupling the hose at either end with a metal coupling, and such connection of the hose to the system and prevention of the leakage of the refrigerant or the like at the connection are realized by the resilience of the deformed hose. As a consequence, prevention of the refrigerant leakage at and/or near the metal coupling, the compression set resistance is heavily influenced by the modulus at the temperature of use of the rubber composition constituting the inner tube and/or the outer cover of the hose and compression set by aging. The compression set which greatly affects the leakage for metal coupling of the hose, of the BIMS has been superior to IIR but inferior to EPDM, and improvement in the compression set of the BIMS has been awaited. Compression set has been known to be greatly affected by the vulcanization system of the rubber composition. The vulcanization system of the BIMS is not fully elucidated due to its uniqueness, and for example, a BIMS which has excellent compression set suffered from inferior scorch resistance and insufficient processability (burning). A BIMS which has an improved balance between the compression set and other properties, and in particular, the scorch is not yet known.

A refrigerant hose is also required to have a gas (refrigerant) impermeability (barrier properties for a refrigerant). A barrier resin such as polyamide resin is often used for the innermost layer which is in contact with the refrigerant. A hose is also expected to have an improved vibration absorbability in view of the higher requirements for the comfort and ride of a car.

Some barrier resins with high refrigerant barrier properties has a high Young's modulus and inferior flexibility, and when such resin is used for an automotive hose, absorbability for the vibration and noise from compressors is insufficient to contribute for the prevention of the vibration and noise transmission. No material and no technology have so far been developed that have realized both the gas impermeability and the vibration absorbability at a sufficient level.

SUMMARY OF THE INVENTION

The present invention has been completed in view of the situation as described above, and an object of the present invention is to provide a rubber composition adapted for producing a hose which has excellent scorch property and compression set, and which can be stably worked into a hose having sufficient moisture impermeability, ozone resistance, and compression set; a hose produced by using such a rubber composition set; as well as a rubber composition adapted for use in producing a hose having excellent gas impermeability and vibration absorbability; and a refrigerant hose and method for producing the same.

In order to obviate such problems, the inventors of the present invention have carried out an intensive investigation and found out that, by using of a rubber composition comprising a combination of a BIMS of particular compositional range and a particular vulcanization system, a hose can be produced without suffering from scorch and adhesion between the hose inner tube and the exterior reinforcing layer is increased, and as a consequence, burst pressure, compression set resistance, moisture impermeability and ozone resistance are improved. The inventors also found that a refrigerant hose having excellent gas impermeability and vibration absorbability in addition to the above-mentioned properties can be produced by extruding the inner tube of the hose in an extruder of particular structure using a rubber composition comprising a BIMS of particular compositional range blended with a particular filler. The present invention is completed on the bases of such findings.

According to first aspect of the present invention, there is provided a rubber composition for hose production comprising (A) 100 parts by weight of a brominated copolymer of a $C_{4-7}$ isomonoolefin and a p-alkylstyrene (PMS) wherein p-alkylstyrene content is 5 to 25% by weight and bromine (Br) content is at least 1.5% by weight, and weight ratio of bromine unit to p-alkylstyrene unit is such that 0.15<Br/PMS<0.40;

(B) 0.1 to 10 parts by weight of zinc white; and (C) 1 to 15 parts by weight of brominated alkylphenol resin, and a hose produced by using such rubber composition for the inner tube and/or the outer cover.

According to second aspect of the present invention, there is provided a rubber composition for hose production comprising (A) 100 parts by weight of a brominated copolymer of a $C_{4-7}$ isomonoolefin and a p-alkylstyrene (PMS) wherein p-alkylstyrene content is 5 to 25% by weight and bromine (Br) content is at least 1.5% by weight, and weight ratio of bromine unit to p-alkylstyrene unit is such that 0.15<Br/PMS<0.40; and (D) 25 to 200 parts by weight of an inorganic laminar compound or 20 to 200 parts by weight of talc, and, a hose produced by using such rubber composition for the inner tube.

According to third aspect of the present invention, there is provided a rubber composition for hose production comprising (A) 100 parts by weight of a brominated copolymer of a $C_{4-7}$ isomonoolefin and a p-alkylstyrene (PMS) wherein p-alkylstyrene content is 5 to 25% by weight and bromine (Br) content is at least 1.5% by weight, and weight ratio of bromine unit to p-alkylstyrene unit is such that 0.15<Br/PMS<0.40;

(B) 0.1 to 10 parts by weight of zinc white;

(C) 1 to 15 parts by weight of brominated alkylphenol resin; and (D) 25 to 200 parts by weight of an inorganic laminar compound or 20 to 200 parts by weight of talc, and a hose produced by using such rubber composition for the inner tube.

According to fourth aspect of the present invention, there is provided a rubber composition for hose production comprising a process for producing a refrigerant hose comprising at least two layers of an inner tube and a reinforcing layer on the exterior of the inner tube, wherein said inner tube is fabricated from the rubber composition according to said second or third aspect of the invention, and said inner tube is formed by in-die drawing method wherein drawing ratio (a/b) of the cross-sectional area at the die inlet (a) to the cross-sectional area of the extrudate at the die outlet (b) is at least 5.

DETAILED DESCRIPTION OF THE INVENTION

Next, the rubber composition for hose production of the present invention (hereinafter referred to as the composition of the present invention), the hose, and the refrigerant hose and its production process are described in detail.

First aspect of the present invention is a rubber composition containing a BIMS, zinc white, and a brominated alkylphenol resin. The BIMS is a brominated copolymeric rubber of isomonoolefin containing 4 to 7 carbon atoms and p-alkylstyrene (PMS), wherein p-alkylstyrene (PMS) content and bromine (Br) content are within particular ranges, and weight ratio (Br/PMS) of the bromine unit to the p-alkylstyrene unit is within a particular range.

More illustratively, BIMS is a brominated copolymeric rubber of an isomonoolefin containing 4 to 7 carbon atoms and a p-alkylstyrene which has p-alkylstyrene (PMS) content of 5 to 25% by weight, bromine (Br) content of at least 1.5% by weight, and weight ratio of bromine unit to p-alkylstyrene unit of 0.15<Br/PMS<0.40. The BIMS has a Mooney viscosity (ML 1+8, 125° C.) of at least 30.

Exemplary isomonoolefins containing 4 to 7 carbon atoms include isobutylene.

Exemplary p-alkylstyrenes are styrenes having an alkyl group of 1 to 5 carbon atoms at para position such as p-methylstyrene and p-ethylstyrene. Content of the p-alkylstyrene in the BIMS is in the range of 5 to 25% by weight, and preferably 5 to 10% by weight, and this content is for all of those having the p-alkylstyrene skeleton including those wherein the alkyl group has been brominated as described below. The p-alkylstyrene content of less than 5% by weight is unfavorable since the desired content of the brominated p-alkylstyrene wherein the alkyl group is brominated can not be attained, and the resulting rubber composition suffers from poor compression set resistance and insufficient gas impermeability due to the low crosslinking density. The p-alkylstyrene content in excess of 25% by weight is undesirable since the resulting rubber composition suffers from poor low temperature durability and becomes brittle at low temperature.

Any brominated copolymeric rubber of the isomonoolefin and the p-alkylstyrene may be used as long as the substituent at para position of the p-alkylstyrene is an alkyl group containing 1 to 5 carbon atoms and the primary and/or the secondary alkyl bromide of such alkyl group is included.

The bromine content is at least 1.5% by weight, and preferably in the range of 1.5 to 3% by weight. The bromine content of less than 1.5% by weight is unfavorable since the number of crosslinking points is reduced and the resulting rubber composition of the present invention suffers from insufficient compression set resistance and gas impermeability as well as week adhesion with the fiber constituting the reinforcing layer.

When the BIMS is used for the inner tube of a hose and the inner tube is required to function properly, the BIMS used should be capable of maintaining a certain level of crosslinking density (and hence, a certain level of modulus) as well as a certain level of adhesion with the reinforcing layer. It is therefore required that the BIMS as the p-alkylstyrene is used at a content of 2 to 25% by weight, bromine (Br) is used at a content of at least 1.5% by weight, and weight ratio of bromine unit to p-alkylstyrene unit is 0.15<Br/PMS<0.40.

When Br/PMS is less than 0.15, vulcanization will be incomplete and modulus will be insufficient. When Br/PMS is in excess of 0.40, amount of bromine will be excessive in relation to the PMS which provides the reaction site, and Br/PMS will be unstable. Accordingly, when Br/PMS is in the range of 0.15<Br/PMS<0.40, the inner tube and/or the outer cover produced from the rubber composition exhibits high adhesiveness with the reinforcing layer as well as suppressed refrigerant and moisture permeation owing to the appropriate crosslinking density. Such suppressive effects are even more significant at the weight ratio of 0.20<Br/PMS<0.40.

The rubber composition exhibits good processability and excellent mechanical strength when Mooney viscosity (ML 1+8, 125° C.) of the BIMS is 30 or higher, and in particular, in the range of 35 to 70.

BIMS may be produced, for example, by the method as described below. That is, the isomonoolefin and the p-alkylstyrene are mixed and copolymerized in a copolymerization reactor in the presence of a catalyst such as Lewis acid catalyst and a diluent for polymerization to thereby obtain the copolymeric rubber. Exemplary polymerization processes are slurry polymerizations, solution polymerizations, and cement suspension polymerizations. The solution polymerizations and cement suspension polymerizations can be run at such temperature as about −35° C. to −100 ° C. depending on the particular catalyst system and the molecular weight desired for the copolymeric rubber. The overall residence time can vary depending upon catalyst activity and concentration, monomer concentration, reaction temperature, and the like, and generally will be between about one minute and five hours, and preferably between about 10 and 60 minutes.

The bromination may be conducted by subjecting the copolymer of the isomonoolefin and the p-alkylstyrene to any of the known bromination processes such as radical halogenation. A typical radical initiator used in the bromination is azo bisisobutyronitrile.

BIMS is commercially available, and an exemplary such commercially available BIMS is EXXPRO® available from Exxon Chemical K.K.

In the first aspect of the present invention, the scorch resistance and the low compression set are simultaneously improved by combining the BIMS of the composition as described above with a particular vulcanization system, and as a consequence, a hose having good fitness of a metal coupling is obtained. The particular vulcanization system used is a combination of zinc white and a brominated alkylphenol resin.

Zinc white (ZnO) is used at a content of 0.1 to 10 parts by weight, and preferably, at 0.5 to 5 parts by weight per 100 parts by weight of BIMS. Vulcanization will be insufficient at the content of less than 0.1 part by weight, and the resulting rubber composition will suffer from insufficient physical properties including the strength, and insufficient compression set resistance. Use of the zinc white in excess of 10 parts by weight is undesirable since the effect of improving the vulcanization is saturated and heat resistance is reduced at such content.

A brominated alkylphenol resin is a resin having the skeleton produced by condensing phenol and a brominated alkylphenol by formaldehyde or the like. Such brominated alkylphenol resins are commercially available, for example, from TAOKA CHEMICAL CO., LTD. under the designation of Tackyrol® 250-I. The content of the brominated alkylphenol resin is 1 to 15 parts by weight, and preferably 2 to 10 parts by weight per 100 parts by weight of BIMS. Use of the brominated alkylphenol resin of less than 1 part by weight is insufficient for improving the compression set resistance. The effect of improving the compression set resistance is saturated at the content in excess of 15 parts by weight, and such content may also be detrimental to heat resistance.

The vulcanization system of the present invention may further contain other rubbers, vulcanization aid, and vulcanization accelerator. Use of a vulcanization aid is particularly recommended since the zinc white which is a critical component in the present invention is activated by such vulcanization aid.

Exemplary other rubbers include butyl rubbers and ethylene-propylene copolymer rubbers.

Exemplary vulcanization aids include fatty acids such as acetylic acid, propionic acid, butanoic acid, stearic acid, acrylic acid, and maleic acid; and zinc salt of fatty acids such as zinc acetylate, zinc propionate, zinc butanoate, zinc stearate, zinc acrylate and zinc maleate.

Exemplary vulcanization accelerators include thiuram accelerators such as tetramethyl thiuram disulfide (TMTD) and tetraethyl thiuram disulfide (TETD); aldehyde-ammonia accelerators such as hexamethylenetetramine; guanidine accelerators such as diphenylguanidine; thiazole accelerators such as dibenzothiazyl disulfide (DM); and sulfeneamide accelerators such as sulfeneamide cyclohexylbenzothiazyl sulfeneamide.

In addition to the critical components as described above, the composition of the present invention may further include other additives to the extent that the merits of the present invention are not impaired. Exemplary such additives include fillers such as carbon black and clay; softeners such as paraffin oils, plasticizers, process aids, antioxidants and pigments.

The composition of the present invention which has the constitution as described above is provided with excellent compression set resistance in addition to the moisture impermeability and weatherability (ozone resistance), and simultaneously, with scorch resistance. Therefore, the composition of the invention enables stable processability.

In a typical process for producing the composition of the present invention, BIMS is mixed with carbon black, paraffin oil, and other optional additives, in an open mill (mixing roll), an internal mixer (Bambury mixer), a kneader, or the like. The composition is then mixed with the zinc white and the brominated alkylphenol resin of the above-specified amounts and other optional vulcanization aid and vulcanization accelerator, and the mixture is heated, for example, at 140 to 250° C. for about 5 to 200 minutes to promote the vulcanization.

In the second aspect of the present invention, gas impermeability as well as vibration absorbability are improved by blending an inorganic laminar compound.

In the third aspect of the present invention, scorch resistance of the composition is improved to enable stable processability, and moisture impermeability, weatherability (ozone resistance), gas impermeability as well as vibration absorbability are improved by blending zinc white, a brominated alkylphenol resin, and an inorganic laminar compound.

An inorganic laminar compound is a compound wherein a laminar structure is formed by a laminate of unit crystal layers. The laminar structure is formed from planes wherein atoms are strongly bonded and densely aligned by covalent bond or the like, and the planes are stack in substantially parallel layers by weak binding force such as van der Waals force. Exemplary inorganic laminar compounds include graphite, phosphate derivative compounds (zirconium phosphate compounds and the like), calcogenides, and clay minerals. Typical inorganic laminar compounds are talc, kaolinite, bentonite, and other clays, montmorillonite, white mica, gold mica, and other micas, chlorite, and the like.

Of such inorganic laminar compounds, the preferred is fine powder talc, and in particular, the fine powder talc having a specific surface area of at least 17,000 $cm^2/g$ and an average diameter of 0.2 to 20 $\mu$m, and most preferably 0.2 to 2.5 $\mu$m. Use of such talc wherein content of the particles having the average particle size of at least 5 $\mu$m is up to 10% by weight and wherein such content is preferably up to 8% by weight is more effective. The average particle size of the talc is evaluated with a laser diffraction particle size analyzer. Use of the fine powder talc having an average aspect ratio of at least 3, preferably at least 4, and most preferably at least 5 is even more effective.

The inorganic laminar compound which is most preferably talc may be either the one which has been surface treated or the one which has not been surface treated. Exemplary surface treatments include chemical treatments completed by using a silane coupling agent, a higher fatty acid, metal salt of a fatty acid, an organic titanate or the like and physical treatments. Use of the surface treated inorganic laminar compound enables production of the rubber composition wherein easy mixing, extrusion and other process are improved.

The inorganic laminar compound is blended at an amount of 25 to 200 parts by weight, and preferably, at an amount of 25 to 150 parts by weight per 100 parts by weight of the BIMS. In the case of the talc, the amount blended is 20 to 150 parts by weight, and preferably 25 to 150 parts by weight per 100 parts by weight of the BIMS. When the content of the inorganic laminar compound is outside such range, the hose produced will suffer from insufficient refrigerant permeability as well as insufficient flexibility and processability.

In the second and the third aspects of the present invention, the ingredients used in the first aspect of the invention can be used, and the rubber composition can be made by the production process as described for the first aspect of the invention.

Next, the refrigerant hose produced by using the rubber composition of the invention as described above (which is hereinafter referred to as the hose of the present invention) as well as the process for producing the refrigerant hose according to fourth aspect of the present invention are described.

First embodiment of the refrigerant hose of the present invention is a hose adapted for passage of a refrigerant comprising an inner tube, a reinforcing layer, and an outer cover, and wherein the composition of the present invention is used either one or both of the inner tube and outer cover. In other words, both of the inner tube and outer cover of the refrigerant hose of the present invention may be fabricated by using the composition of the present invention, while it is also possible to fabricate one of the inner tube and outer cover from the composition of the present invention and the other layer from a rubber composition commonly used in the art. In addition, the inner tube and outer cover of the hose may comprise either a single layer or two or more layers, and it is then required that at least one layer of the inner tube is fabricated from the rubber composition of the present invention.

This embodiment includes within its scope a hose of the structure wherein an intermediate layer is provided between the outer cover and the inner tube, and the reinforcing layers are provided in double. It is also possible to use a thermoplastic resin, a thermoplastic elastomer, or a composition thereof for one or more layers of the inner tube and/or the outer cover in an extent that the flexibility and the vibration absorbability are not impaired.

Second embodiment of the refrigerant hose of the present invention is a hose comprising at least two layers, namely, at least the inner tube and the reinforcing layer, and wherein the composition of the present invention is used at least for the inner tube of the hose. The inner tube may comprise either a single layer or two or more layers, and it is then required that at least one layer of the inner tube is fabricated from the rubber composition of the present invention. In addition, one or more layers of the inner tube may be fabricated by using a thermoplastic resin, a thermoplastic elastomer, or a composition thereof for in an extent that the flexibility and the vibration absorbability are not impaired.

The inner tube may preferably have a thickness of at least 1.5 mm, and more preferably, a thickness of 1.5 to 3.0 mm. The hose may otherwise suffer from insufficiency in gas impermeability and flexibility.

Exemplary reinforcing layers include layers of braided and spiraled reinforcing yarns or reinforcing wires, net of reinforcing yarns, and films. Exemplary reinforcing yarns include yarns of aramid, nylon, rayon, vinylon, and polyester fibers, and exemplary reinforcing wires include brass or zinc plated steel wires to impart anti-rust properties as well as adhesiveness. Use of a reinforcing yarn is preferable in view of its higher vibration absorbability.

The hose of the present invention may have an outer cover formed on the exterior of the reinforcing layer. The outer cover may be formed from any rubber composition which can be vulcanized under the vulcanization conditions similar to those of the rubber composition used for the inner tube. Exemplary such rubbers include butyl rubbers such as halogenated butyl rubbers, ethylene-propylene copolymeric rubbers such as ethylene-propylene rubbers and ethylene-propylene-diene rubbers, chloroprene rubbers, and styrene-butadiene rubbers. The preferred are the rubber composition of the present invention, butyl rubbers and ethylene-propylene copolymeric rubbers.

The outer cover may have a thickness of at least 1.0 mm which is similar to common hoses, and preferably, the thickness is in the range of 1.0 to 1.5 mm. The hose may otherwise suffer from insufficiency of moisture impermeability and flexibility.

For the production of the hose comprising the composition according to first aspect of the present invention, a conventional process which has been used for the hose production may be used. The hose may be produced, for example, by extruding the unvulcanized rubber composition of the present invention on the mandrel which has been preliminarily coated with a releasing agent to form the inner tube; coating an adhesive on the inner tube if necessary; braiding or spiral winding the reinforcing yarn or reinforcing wire on the inner tube by using a braiding machine to form the braided reinforcing layer; and extruding the composition of the present invention on the braided layer to form the outer cover.

The vulcanization is thereafter effected by applying pressure and high temperature using such medium as steam either directly or after wrapping the hose with a tape or the like, and in this process, the hose is heated to 130 to 200° C., and preferably to 150 to 170° C. After the vulcanization, the hose is cooled, and the mandrel is removed to thereby obtain the hose of the present invention. Exemplary adhesives which may be optionally used include isocyanate resin adhesives, urethane resin adhesives, epoxy resin adhesives, phenol resin adhesives, resorcine resin adhesives, and chlorinated rubber adhesives.

Figure 1:
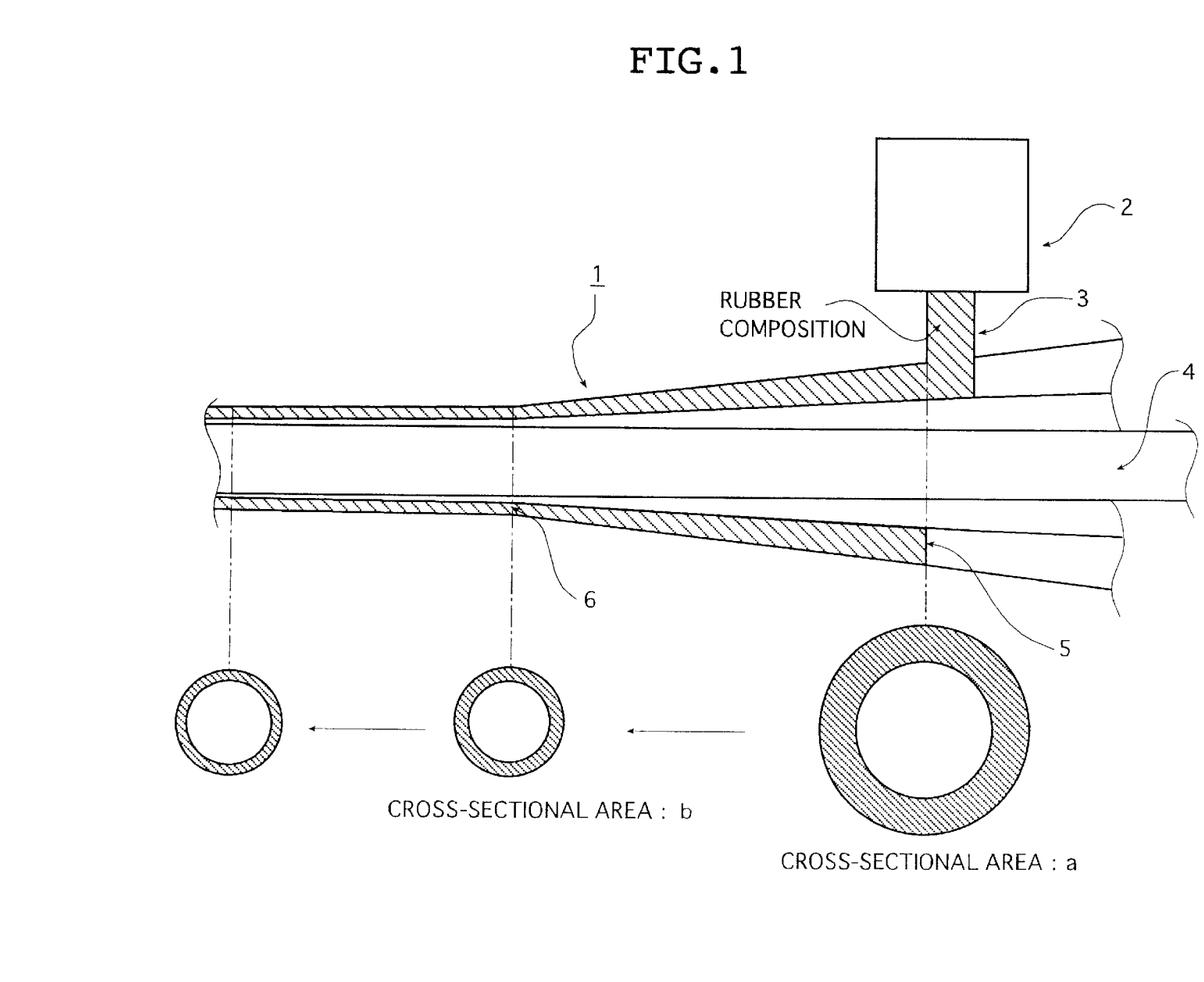
FIG. 1 is a schematic view of the main part of an embodiment of the cross-head die used in the production of the refrigerant hose of the present invention.

The refrigerant hose comprising the rubber compositions according to the second or the third aspect of the present invention, namely, the rubber compositions containing the inorganic laminar compound is preferably produced by using an extruder adapted for in-die drawing method. A typical production process is described by referring to FIG. 1 showing the main part of a cross-head die extruder 2.

The rubber composition of the present invention which has been preliminarily mixed is supplied from the extruder 2 to feed line 3, and then, to inlet 5 of the cross-head die 1. The composition is then extruded onto the mandrel 4 in the die 1, and the extruded rubber composition is pulled along the mandrel 4 by a caterpillar (not shown) which is provided outside the outlet 6 of the cross-head die. The extruded rubber composition is thereby formed into the hose inner tube on the exterior of the mandrel 4. The ratio (drawing ratio) a/b of cross-sectional area a of the space (clearance) defined between the inner surface of the cross-head die 1 and the mandrel 4 at the inlet 5 of the cross-head die 1 to cross-sectional area b of the inner tube extruded from the outlet 6 of the cross-head die 1 is preferably adjusted to at least 5, and preferably to at least 10, and more preferably to 10 to 100.

To maintain such drawing ratio, the cross-sectional area a of the space (clearance), the distance between the inlet 5 and the outlet 6 of the cross-head die 1, and the pulling rate by the caterpillar may be appropriately adjusted. The thickness of the hose inner tube can be reduced if the inner tube extruded from the outlet 6 of the cross-head die is further pulled by the caterpillar.

When the drawing ratio is within such range, the inorganic laminar compound in the rubber composition is aligned in the course of the extrusion in the direction parallel to the extrusion direction, namely, in the longitudinal direction of the inner tube and the thus aligned inorganic laminar compound is stack in layers one another to suppress the gasses such as the refrigerant from going through the hose inner tube.

The reinforcing layer and the optional outer cover are provided in a procedure similar to the hose production using the rubber composition according to the first aspect of the invention.

The hose produced by using the rubber composition according to the first aspect of the present invention has excellent moisture impermeability, weatherability (ozone resistance) and compression set resistance since such composition is used for the inner tube and/or the outer cover. Accordingly, the hose is adapted for use as a refrigerant hose such as the hose for Freon or the hose of an air conditioner wherein incorporation of moisture into the fluid flowing therethrough should be avoided; a hose for a radiator which should endure the passage of high-temperature water therethrough; a hose for hot water; a hose for steam which should endure the high-temperature steam passage therethrough; and the like.

The hose produced by using the rubber composition according to the second aspect of the present invention has excellent moisture impermeability and weatherability (ozone resistance) as well as sufficient compression set resistance, gas impermeability and vibration absorbability since such composition is used for the inner tube. Accordingly, the hose is adapted for use as a refrigerant hose such as the hose for Freon or the hose of an air conditioner wherein incorporation of moisture into the fluid flowing therethrough should be avoided.

The hose produced by using the rubber composition according to the third aspect of the present invention has excellent moisture impermeability and weatherability (ozone resistance) as well as sufficient gas impermeability and vibration absorbability since such composition is used for the inner tube. Accordingly, the hose is adapted for use as a refrigerant hose such as the hose for Freon or the hose of an air conditioner wherein incorporation of moisture into the fluid flowing therethrough should be avoided; a hose for a radiator which should endure the passage of high-temperature water therethrough; a hose for hot water; a hose for steam which should endure the high-temperature steam passage therethrough; and the like.

EXAMPLES

The present invention is described in further detail by referring to Examples of the invention and Comparative Examples.

Examples 1 to 8, Comparative Examples 1 to 12, and Prior Art Examples 1 and 2

The rubber compositions of Examples and Comparative Examples shown in Table 1 were produced by mixing the ingredients in a laboratory internal mixer (Bambury mixer). In Table 1, the amounts of the ingredients are shown in parts by weight. Each blank shows zero of ingredients. The resulting compositions were evaluated for their scorch resistance, compression set resistance, and adhesiveness by the procedure as described below. The results are shown in Table 1. Rubber compositions respectively containing IIR and EPDM which have been used as rubber compositions for water impermeable hoses were also fabricated, and the results of their evaluation are also shown in Table 1 for comparison purpose.

(1) Scorch resistance

Mooney scorch time (t5=ML–5 up) was measured in accordance with the procedure of Mooney Scorch test of JIS K 6300 5 at a test temperature of 125° C. The unit is minutes. A higher value of ML–5 up is preferable for stable processability, and the target value is 8 (min) or longer.

(2) Compression set resistance

The composition was vulcanized at 160° C. for 30 minutes by using a laboratory vulcanizing press to produce a test piece of large size defined in JIS K 6262. In accordance with JIS K 6262, the test piece was subjected to 25% compression and maintained at 120° C. for 70 hours or at 150° C. for 70 hours, and after removing the stress, the test piece was allowed to stand at room temperature for 30 minutes and measured for the compression set (%). 0% compression set means the full recovery from the deformation and full recovery of the original shape, and 100% means that the deformation was not at all recovered. The unit is percent. The target values are up to 50% at 120° C. for 70 hours, and up to 70% at 150° C. for 70 hours.

(3) 100% modulus

The composition was vulcanized at 160° C. for 30 minutes in a laboratory vulcanizing press to produce a sheet of 2 mm thick, from which dumbbell-shaped test pieces were die cutting. The test pieces were evaluated for their 100% modulus (value of tensile stress at 100% elongation of the rubber composition in a tensile test) in accordance with JIS K 6251.

(4) Adhesiveness to yarns as determined by peeling test

The composition was vulcanized at 160° C. for 30 minutes in a laboratory vulcanizing press to produce a sheet, and a strap-shaped test piece with a width of 25 mm was prepared. Peeling test was conducted by using the test piece in accordance with JIS K 6256.

TABLE 1

|  | PAE 1 | PAE 2 | CE 1 | CE 2 | CE 3 | CE 4 | CE 5 | CE 6 | CE 7 | CE 8 | CE 9 |
|---|---|---|---|---|---|---|---|---|---|---|---|
| Rubber (parts by weight) | | | | | | | | | | | |
| BIMS |  |  | 100.0 | 100.0 | 100.0 | 100.0 | 100.0 | 100.0 | 100.0 | 100.0 | 100.0 |
| PMS content (wt %) |  |  | 5.0 | 5.0 | 5.0 | 10.0 | 7.5 | 5.0 | 5.0 | 5.0 | 5.0 |
| Br content (wt %) |  |  | 0.7 | 0.8 | 1.2 | 2.0 | 2.0 | 2.0 | 0.7 | 0.8 | 1.2 |
| Br/PMS |  |  | 0.14 | 0.16 | 0.24 | 0.20 | 0.27 | 0.40 | 0.14 | 0.16 | 0.24 |
| Mooney viscosity: ML 1 + 8 (125° C.) |  |  | 45 | 45 | 45 | 45 | 45 | 45 | 45 | 45 | 45 |
| Cl-IIR | 100.0 |  |  |  |  |  |  |  |  |  |  |
| EPDM |  | 100.0 |  |  |  |  |  |  |  |  |  |
| Carbon black (parts by weight) | 60.0 | 60.0 | 60.0 | 60.0 | 60.0 | 60.0 | 60.0 | 60.0 | 60.0 | 60.0 | 60.0 |
| Paraffin oil (parts by weight) | 10.0 | 10.0 | 10.0 | 10.0 | 10.0 | 10.0 | 10.0 | 10.0 | 10.0 | 10.0 | 10.0 |
| Vulcanization system (parts by weight) | | | | | | | | | | | |
| Zinc white (ZnO) | 5.0 | 5.0 | 0.5 | 0.5 | 0.5 | 0.5 | 0.5 | 0.5 | 3.0 | 3.0 | 3.0 |
| Stearic acid |  | 1.0 | 2.0 | 2.0 | 2.0 | 2.0 | 2.0 | 2.0 | 2.0 | 2.0 | 2.0 |
| Zinc stearate |  |  | 1.0 | 1.0 | 1.0 | 1.0 | 1.0 | 1.0 |  |  |  |
| Brominated alkylphenol resin |  |  |  |  |  |  |  |  | 3.0 | 3.0 | 3.0 |
| Sulfur |  | 0.5 |  |  |  |  |  |  |  |  |  |
| Accelerator TT | 1.5 |  |  |  |  |  |  |  |  |  |  |
| Accelerator DM | 1.5 |  |  |  |  |  |  |  |  |  |  |
| Accelerator TRA |  | 0.5 |  |  |  |  |  |  |  |  |  |
| Accelerator CZ |  | 1.5 |  |  |  |  |  |  |  |  |  |
| Mooney scorch test ML-5up (125° C.) | 14.2 | 10.7 | 21.3 | 19.3 | 17.9 | 18.1 | 17.7 | 17.2 | 11.3 | 10.2 | 9.4 |
| Compression set (%) | | | | | | | | | | | |
| 120° C. × 70 hr | 67 | 41 | 79 | 75 | 67 | 63 | 59 | 57 | 67 | 64 | 57 |
| 150° C. × 70 hr | 95 | 68 | 99 | 94 | 90 | 86 | 82 | 78 | 95 | 92 | 77 |
| Modulus M100 (MPa) | 2.7 | 3.2 | 2.2 | 2.3 | 3.6 | 2.6 | 5.3 | 9.0 | 2.2 | 2.3 | 3.7 |
| Adhesiveness to yarns Peeling strength (N/25 mm) | 63 | 57 | 34 | 40 | 62 | 54 | 72 | 85 | 41 | 50 | 74 |

|  | EX 1 | EX 2 | EX 3 | EX 2 | EX 4 | EX 5 | EX 6 | EX 7 | CE 10 | CE 11 | CE 12 |
|---|---|---|---|---|---|---|---|---|---|---|---|
| Rubber (parts by weight) | | | | | | | | | | | |
| BIMS | 100.0 | 100.0 | 100.0 | 100.0 | 100.0 | 100.0 | 100.0 | 100.0 | 100.0 | 100.0 | 100.0 |
| PMS content (wt %) | 10.0 | 7.5 | 5.0 | 7.5 | 7.5 | 7.5 | 7.5 | 7.5 | 7.5 | 7.5 | 7.5 |
| Br content (wt %) | 2.0 | 2.0 | 2.0 | 2.0 | 2.0 | 2.0 | 2.0 | 2.0 | 2.0 | 2.0 | 2.0 |
| Br/PMS | 0.20 | 0.27 | 0.40 | 0.27 | 0.27 | 0.27 | 0.27 | 0.27 | 0.27 | 0.27 | 0.27 |
| Mooney viscosity: ML 1 + 8 (125° C.) | 45 | 45 | 45 | 45 | 45 | 45 | 45 | 45 | 45 | 45 | 45 |
| Cl-IIR |  |  |  |  |  |  |  |  |  |  |  |
| EPDM |  |  |  |  |  |  |  |  |  |  |  |
| Carbon black (parts by weight) | 60.0 | 60.0 | 60.0 | 60.0 | 60.0 | 60.0 | 60.0 | 60.0 | 60.0 | 60.0 | 60.0 |
| Paraffin oil (parts by weight) | 10.0 | 10.0 | 10.0 | 10.0 | 10.0 | 10.0 | 10.0 | 10.0 | 10.0 | 10.0 | 10.0 |
| Vulcanization system (parts by weight) | | | | | | | | | | | |
| Zinc white (ZnO) | 3.0 | 3.0 | 3.0 | 3.0 | 0.5 | 10.0 | 3.0 | 3.0 | 0.5 |  | 3.0 |
| Stearic acid | 2.0 | 2.0 | 2.0 | 2.0 | 2.0 | 2.0 | 2.0 | 2.0 | 2.0 | 2.0 | 2.0 |
| Zinc stearate |  |  |  |  |  |  |  |  |  |  |  |
| Brominated alkylphenol resin | 3.0 | 3.0 | 3.0 | 3.0 | 3.0 | 3.0 | 1.0 | 15.0 |  | 3.0 |  |
| Sulfur |  |  |  |  |  |  |  |  |  |  |  |
| Accelerator TT |  |  |  |  |  |  |  |  | 1.0 |  |  |
| Accelerator DM |  |  |  |  |  |  |  |  |  |  |  |
| Accelerator TPA |  |  |  |  |  |  |  |  |  |  |  |
| Accelerator CZ |  |  |  |  |  |  |  |  |  |  |  |
| Mooney scorch test ML-5up (125° C.) | 9.7 | 9.3 | 9.1 | 9.3 | 15.6 | 9.3 | 11.2 | 9.1 | 4.6 | >45 | 25.4 |
| Compression set (%) | | | | | | | | | | | |
| 120° C. × 70 hr | 43 | 42 | 38 | 42 | 48 | 42 | 48 | 42 | 38 | 100 | 63 |
| 150° C. × 70 hr | 65 | 64 | 59 | 64 | 67 | 65 | 69 | 64 | 47 | 100 | 86 |
| Modulus M100 (MPa) | 2.6 | 5.6 | 9.7 | 5.6 | 5.3 | 5.5 | 6.2 | 5.6 | 6.2 | 2.2 | 2.3 |
| Adhesiveness to yarns Peeling strength (N/25 mm) | 65 | 86 | 102 | 86 | 84 | 88 | 82 | 93 | 52 | 63 | 68 |

PAE: Prior Art Example, CE: Comparative Example, EX: Example

Examples 1 to 3 and Comparative Examples 1 to 9

These Examples and Comparative Examples are the examples for demonstrating the merits of limiting the bromine content in the BIMS and Br/PMS weight ratio, and the addition of brominated alkylphenol resin.

Comparison of Examples 1 to 3 and Comparative Examples 1 to 9 demonstrate that use of the vulcanization system of the present invention is not effective in improving the compression set resistance in the case of Comparative Examples 1 to 6 wherein the bromine content in the BIMS is outside the scope of the present invention and the brominated alkylphenol resin is not blended.

In the case of Comparative Examples 7 to 9 wherein the brominated alkylphenol resin is blended, use of the vulcanization system of the present invention is less effective in improving the compression set resistance compared to the case of Comparative Examples 1 to 3 since the Br/PMS weight ratio in the BIMS is outside the scope of the present invention. Comparative Examples 7 to 9 are also inferior in the adhesiveness with the reinforcing yarn. In contrast, Examples 1 to 3 exhibit excellent compression set resistance and adhesiveness with the reinforcing yarn since the bromine content in the BIMS, amount of the brominated alkylphenol resin added, and Br/PMS weight ratio are all within the scope of the present invention.

Examples 2 and 4 to 7 and Comparative Examples 10 to 12

These Examples and Comparative Examples are the examples for demonstrating the merits of including the zinc white and the brominated alkylphenol resin.

Comparative Example 10 is different from Example 2 in that Comparative Example 10 is free from the brominated alkylphenol resin, and in Comparative Example 10, compression set resistance is improved by selecting an appropriate vulcanization system while scorch resistance is still insufficient. Due to such inferior scorch resistance, the composition of Comparative Example 10 suffered from scorch in the course of extrusion, and no further processing could be effected. In contrast, the composition of Example 2 has improved compression set resistance as well as excellent scorch resistance. Therefore, the composition of Example 2 has improved processing susceptibility simultaneously with the improved compression set resistance.

When Examples 4 and 5 and Comparative Example 11 are compared, Comparative Example 11 which is free from the zinc white, one of the essential component in the present invention, suffers from insufficient vulcanization, and hence, from inferior compression set resistance. In contrast, the compositions of Examples 4 and 5 whose zinc white content is within the scope of the present invention exhibit good vulcanizability as well as satisfactory compression set resistance. However, improvement in the compression set resistance is saturated in Example 6 since the zinc white content is at its maximum within the scope of the invention.

When Examples 6 and 7 and Comparative Example 12 are compared, Comparative Example 12 which is free from the brominated alkylphenol resin, one of the essential component in the present invention, suffers from insufficient compression set resistance. In contrast, the compositions of Examples 6 and 7 whose zinc white content is within the scope of the present invention exhibit satisfactory compression set resistance. However, it should be noted that the compression set resistance is improved in the case of Example 6 to an extent somewhat less than that of Example 2 since the content of the brominated alkylphenol resin is at its minimum within the scope of the invention. The improvement in the compression set resistance is also saturated in Example 7 wherein brominated alkylphenol resin content is at its maximum within the scope of the invention when compared to Example 2.

Figure 3:
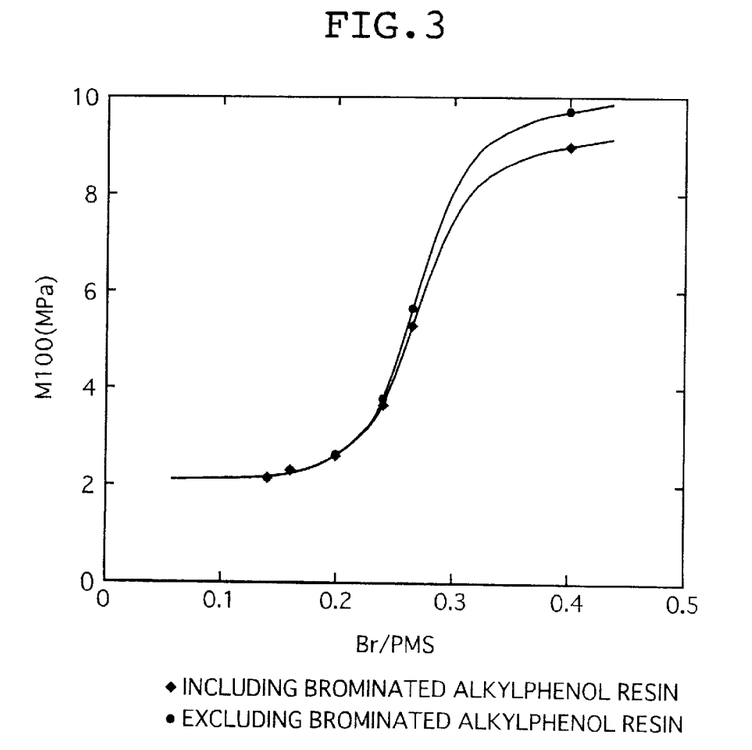
FIG. 3 is a graph showing 100% modulus of the rubber (the value of tensile stress at 100% elongation in tensile test) in relation to weight ratio of bromine content to PMS content (Br/PMS) of the brominated copolymer of the isomonoolefin and p-alkylstyrene (PMS) of the present invention.

FIG. 3 shows 100% modulus of the rubber composition (value of tensile stress at 100% elongation of the rubber composition in a tensile test) in relation to the Br/PMS ratio in the BIMS, and in other words, relation of the crosslinking density of the rubber composition with the Br/PMS of the BIMS. As demonstrated in FIG. 3, the Br/PMS of particular value corresponds to the modulus of particular value.

Figure 4:
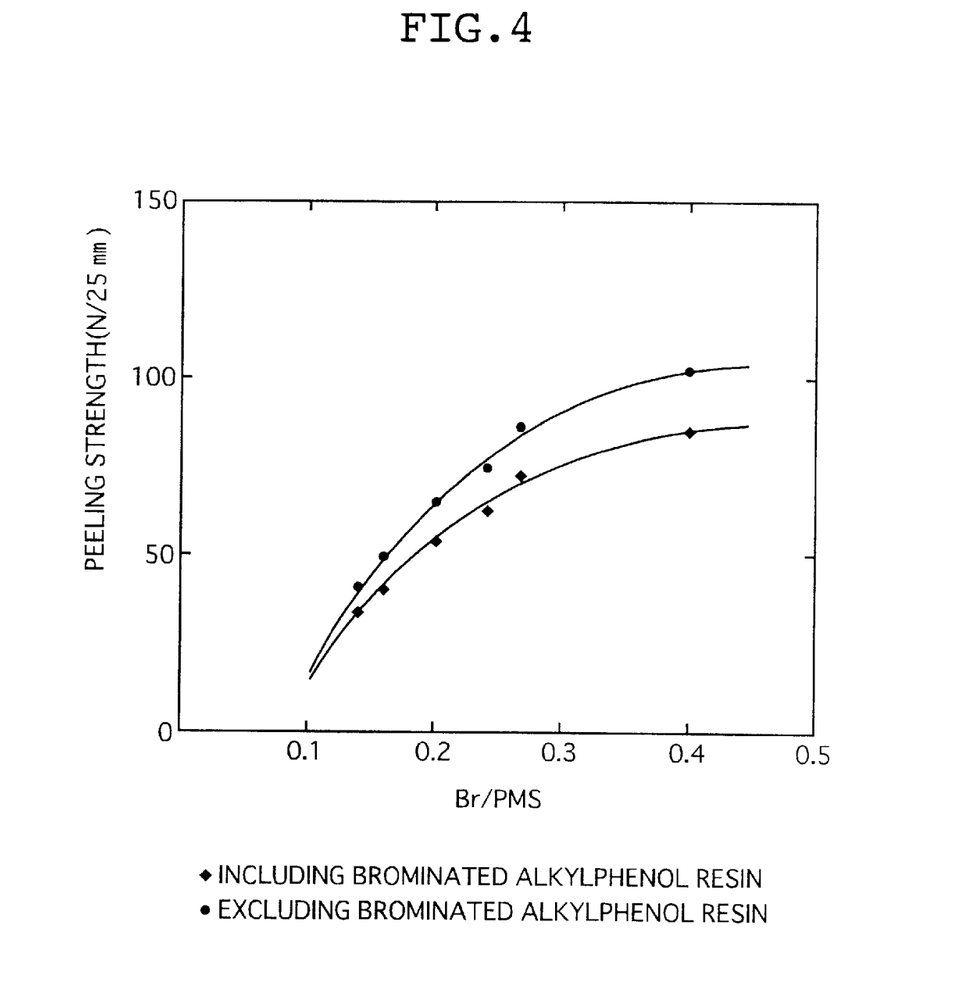
FIG. 4 is a graph showing peeling strength of polyester reinforcement thread from the rubber composition of the present invention in relation to weight ratio of bromine content to PMS content (Br/PMS) of the brominated copolymer of the isomonoolefin and p-alkylstyrene (PMS) of the present invention used for the inner tube in the hose of the present invention.

FIG. 4 shows peeling strength of the rubber composition from the polyester reinforcing yarn in relation to the Br/PMS ratio in the BIMS. As demonstrated in FIG. 4, the adhesiveness significantly depends on the particular Br/PMS ratio of the BIMS.

The ingredients used in the Examples, Comparative Examples, and Prior Art Examples are as described below.

Cλ-IIR: Exxonbutyl 1066, manufactured by EXXON CHEMICAL INTERNATIONAL-ASIA

EPDM: Mitsui EPT 4070, manufactured by MITSUI CHEMICALS, INC.

Carbon black (HAF grade) Seast 3®, manufactured by TOKAI Carbon K.K.

Paraffin oil: machine oil 22, SHOWA SHELL SEKIYU K.K.

Zinc white (zinc oxide): zinc white No. 3, manufactured by SEIDO CHEMICAL INDUSTRIAL CO., LTD.

Stearic acid: beaded stearic acid manufactured by NOF Corporation

Zinc stearate: zinc stearate, manufactured by SEIDO CHEMICAL INDUSTRIAL CO., LTD.

Brominated alkylphenol resin: Tackyrol 250-I®, manufactured by TAOKA Chemical Co., Ltd.

Sulfur: powdered sulfur, manufactured by Karuizawa Seirensho

Silica: Nipsil VN3®, manufactured by NIPPON SILICA INDUSTRIAL CO., LTD.

Calcium carbonate: ground calcium carbonate, manufactured by MARUO CALCIUM CO., LTD.

Clay: SUPREX clay®, manufactured by HUBER Corp.

Mica: Yamaguchi Mica A-51, manufactured by YAMAGUCHI MICA CO., LTD.

Talc: Mistoron Vapor®, manufactured by Japan Mistoron CO.

Vulcanization accelerator TT: Tetramethyl thiuram disulfide, Nocceler TT®, manufactured by OUCHISHINKO CHEMICAL INDUSTRIAL CO., LTD.

Vulcanization accelerator DM: dibenzothiazylsulfide, Nocceler DM®, manufactured by OUCHISHINKO CHEMICAL INDUSTRIAL CO., LTD.

Vulcanization accelerator TRA: 2-dipentamethylenethiuram tetrasulfide, Sanceler TRA®, manufactured by Sanshin Chemical Ind. Co., Ltd.

Vulcanization accelerator CZ: N-cyclohexyl-2-benzothiazole sulfenamide®, Nocceler CZ®, manufactured by OUCHISHINKO CHEMICAL INDUSTRIAL CO., LTD.

Examples 8 to 18 and Comparative Examples 5, 13 to 24

Figure 2:
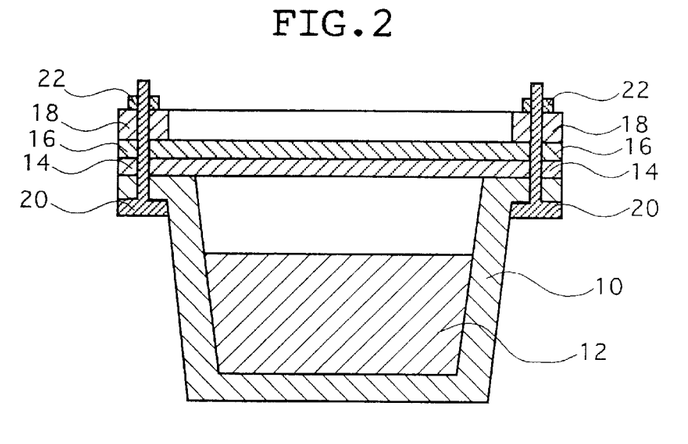
FIG. 2 is a cross-sectional view of the measuring cup used in the measurement of gas impermeability and moisture impermeability of the rubber composition for hose production of the present invention.

The rubber compositions of Examples and Comparative Examples shown in FIG. 2 were produced by mixing the ingredients in a laboratory internal mixer. In Table 2, the amounts of the ingredients are shown in parts by weight. The resulting compositions were vulcanized at 160° C. for 30 minutes in a laboratory vulcanizing press to produce a sheet of 0.5 mm thick. The rubber compositions were evaluated for gas impermeability and moisture impermeability by the procedure as descried below by using the thus produced sheet. The results are shown in Table 2 together with the Mooney scorch time, compression set, and adhesiveness of the compositions.

(5) Freon gas impermeability

As shown in FIG. 2, a stainless steel cup 10 was filled with one-half full of a refrigerant 12 (Freon substitute, HFC 134a), and the opening of the cup 10 was covered with a sheet 14. A sintered metal plate 16 was placed on the sheet 14, and the cup 10, the sheet 14 and the metal plate 16 were tightened to each other with the bolt 20 and the nut 22. The cup 10 was then placed in an atmosphere of 100° C., and the overall weight was measured after 24 hours to determine the weight loss. Freon gas impermeability was evaluated by calculating gas permeation constant according to the equation:

$$\text{Gas permeation constant } [mg \cdot mm/24 \text{ hr} \cdot cm^2] = (M \cdot t)/(T \cdot A)$$

wherein A is the area of permeation (cm²), T is the test period (day), M is the weight loss (mg), and t is the thickness of the sheet (mm).

The refrigerant permeation resistance is favorable when the gas permeation constant is less than 8.0 mg·mm/24 hr·cm².

(6) Moisture impermeability

The procedure of the above (5) was repeated except that water was used instead of the refrigerant 12 and the ambient temperature was 80° C., and after measuring the weight loss, moisture permeation constant was calculated to evaluate the moisture impermeability.

The moisture impermeability is favorable when the gas permeation constant is less than 1.2 mg·mm/24 hr cm².

TABLE 2

|  | CE 5 | CE 13 | CE 14 | CE 15 | CE 16 | CE 17 | EX 8 | CE 18 | EX 9 |
|---|---|---|---|---|---|---|---|---|---|
| Rubber (parts by weight) | | | | | | | | | |
| BIMS | 100.0 | 100.0 | 100.0 | 100.0 | 100.0 | 100.0 | 100.0 | 100.0 | 100.0 |
| PMS content (wt %) | 7.5 | 7.5 | 7.5 | 7.5 | 7.5 | 7.5 | 7.5 | 7.5 | 7.5 |
| Br content (wt %) | 2.0 | 2.0 | 2.0 | 2.0 | 2.0 | 2.0 | 2.0 | 2.0 | 2.0 |
| Br/PMS | 0.27 | 0.27 | 0.27 | 0.27 | 0.27 | 0.27 | 0.27 | 0.27 | 0.27 |
| Mooney viscosity: ML 1 + 8 (125° C.) | 45 | 45 | 45 | 45 | 45 | 45 | 45 | 45 | 45 |
| Cl-IIk | | | | | | | | | |
| EPDM | | | | | | | | | |
| Carbon black (parts by weight) | 60.0 | 60.0 | 60.0 | 60.0 | 60.0 | 60.0 | 60.0 | 60.0 | 60.0 |
| Filler (parts by weight) | | | | | | | | | |
| Silica | | 20.0 | 30.0 | | | | | | |
| Calcium carbonate | | | | 20.0 | 30.0 | | | | |
| Clay | | | | | | 20.0 | 30.0 | | |
| Mica | | | | | | | | 20.0 | 30.0 |
| Talc | | | | | | | | | |
| Paraffin oil (parts by weight) | 10.0 | 10.0 | 10.0 | 10.0 | 10.0 | 10.0 | 10.0 | 10.0 | 10.0 |
| Vulcanization system (parts by weight) | | | | | | | | | |
| Zinc white (ZnO) | 0.5 | 0.5 | 0.5 | 0.5 | 0.5 | 0.5 | 0.5 | 0.5 | 0.5 |
| Stearic acid | 2.0 | 2.0 | 2.0 | 2.0 | 2.0 | 2.0 | 2.0 | 2.0 | 2.0 |
| Zinc stearate | 1.0 | 1.0 | 1.0 | 1.0 | 1.0 | 1.0 | 1.0 | 1.0 | 1.0 |
| Brominated alkylphenol resin | | | | | | | | | |
| Mooney scorch test ML-5up (125° C.) | 17.7 | 17.5 | 17.2 | 18.9 | 19.1 | 18.5 | 18.3 | 18.9 | 19.0 |
| Compression set (%) | | | | | | | | | |
| 120° C. × 70 hr | 59 | 61 | 62 | 64 | 65 | 65 | 66 | 64 | 65 |
| 150° C. × 70 hr | 82 | 82 | 83 | 86 | 87 | 87 | 88 | 86 | 87 |
| Modulus M100 (MPa) | 5.3 | 5.4 | 5.5 | 5.3 | 5.3 | 5.3 | 5.4 | 5.4 | 5.5 |
| Adhesiveness to yarns Peeling strength (N/25 min) | 72 | 69 | 67 | 70 | 68 | 73 | 70 | 70 | 68 |
| Impermeability (mg · mm/24 hr · cm²) | | | | | | | | | |
| Freon gas permeation constant, 100° C. | 9.5 | 9.5 | 9.5 | 9.5 | 9.4 | 8.4 | 7.9 | 8.3 | 7.7 |
| Moisture permeation constant, 80° C. | 1.05 | 1.17 | 1.23 | 1.12 | 1.15 | 1.02 | 1.01 | 0.98 | 0.95 |

|  | EX 10 | EX 11 | CE 3 | CE 19 | CE 20 | CE 21 | CE 22 | EX 12 | EX 13 | CE 23 |
|---|---|---|---|---|---|---|---|---|---|---|
| Rubber (parts by weight) | | | | | | | | | | |
| BIMS | 100.0 | 100.0 | 100.0 | 100.0 | 100.0 | 100.0 | 100.0 | 100.0 | 100.0 | 100.0 |
| PMS content (wt %) | 7.5 | 7.5 | 5.0 | 5.0 | 5.0 | 7.5 | 7.5 | 7.5 | 7.5 | 7.5 |
| Br content (wt %) | 2.0 | 2.0 | 1.2 | 1.2 | 1.2 | 2.0 | 2.0 | 2.0 | 2.0 | 2.0 |
| Br/PMS | 0.27 | 0.27 | 0.24 | 0.24 | 0.24 | 0.27 | 0.27 | 0.27 | 0.27 | 0.27 |
| Mooney viscosity: ML 1 + 8 (125° C.) | 45 | 45 | 45 | 45 | 45 | 45 | 45 | 45 | 45 | 45 |
| Cl-IIk | | | | | | | | | | |
| EPDM | | | | | | | | | | |
| Carbon black (parts by weight) | 60.0 | 60.0 | 60.0 | 60.0 | 60.0 | 60.0 | 60.0 | 60.0 | 60.0 | 60.0 |
| Filler (parts by weight) | | | | | | | | | | |
| Silica | | | | | | | | | | |
| Calcium carbonate | | | | | | | | | | |
| Clay | | | | | | | | | | |
| Mica | | | | | | | | | | |
| Talc | 20.0 | 30.0 | | 20.0 | 30.0 | 10.0 | 15.0 | 150.0 | 200 | 250.0 |
| Paraffin oil (parts by weight) | 10.0 | 10.0 | 10.0 | 10.0 | 10.0 | 10.0 | 10.0 | 10.0 | 10.0 | 10.0 |

TABLE 2-continued

| Vulcanization system (parts by weight) | | | | | | | | | | |
|---|---|---|---|---|---|---|---|---|---|---|
| Zinc white (ZnO) | 0.5 | 0.5 | 0.5 | 0.5 | 0.5 | 0.5 | 0.5 | 0.5 | 0.5 | 0.5 |
| Stearic acid | 2.0 | 2.0 | 2.0 | 2.0 | 2.0 | 2.0 | 2.0 | 2.0 | 2.0 | 2.0 |
| Zinc stearate | 1.0 | 1.0 | 1.0 | 1.0 | 1.0 | 1.0 | 1.0 | 1.0 | 1.0 | 1.0 |
| Brominated alkylphenol resin | | | | | | | | | | |
| Mooney scorch test ML-5up (125° C.) | 19.0 | 19.2 | 17.9 | 22.9 | 22.7 | 17.9 | 18.1 | 18.7 | 19.2 | 19.4 |
| Compression set (%) | | | | | | | | | | |
| 120° C. × 70 hr | 62 | 63 | 67 | 67 | 68 | 60 | 62 | 64 | 67 | 69 |
| 150° C. × 70 hr | 84 | 85 | 90 | 89 | 90 | 79 | 83 | 86 | 89 | 91 |
| Modulus M100 (MPa) | 5.4 | 5.5 | 3.6 | 3.7 | 3.8 | 5.3 | 5.4 | 5.8 | 6.0 | 6.1 |
| Adhesiveness to yarns Peeling strength (N/25 min) | 71 | 69 | 62 | 67 | 65 | 73 | 72 | 65 | 64 | 63 |
| Impermeability (mg · mm/24 hr · cm$^2$) | | | | | | | | | | |
| Freon gas perrneation constant, 100° C. | 7.8 | 7.0 | 11.0 | 9.0 | 8.0 | 8.9 | 8.0 | 2.9 | 2.6 | 3.0 |
| Moisture permeation constant, 80° C. | 0.96 | 0.91 | 1.12 | 1.02 | 0.97 | 0.95 | 0393 | 0.89 | 0.91 | 0.98 Un-stable |

| | CE 24 | EX 14 | EX 15 | EX 16 | EX 17 | EX 18 |
|---|---|---|---|---|---|---|
| Rubber (parts by weight) | | | | | | |
| BIMS | 100.0 | 100.0 | 100.0 | 100.0 | 100.0 | 100.0 |
| PMS content (wt %) | 7.5 | 7.5 | 7.5 | 7.5 | 10.0 | 5.0 |
| Br content (wt %) | 2.0 | 2.0 | 2.0 | 2.0 | 2.0 | 2.0 |
| Br/PMS | 0.27 | 0.27 | 0.27 | 0.27 | 0.20 | 0.40 |
| Mooney viscosity: ML 1 + 8 (125° C.) | 45 | 45 | 45 | 45 | 45 | 45 |
| Cl-IIk | | | | | | |
| EPDM | | | | | | |
| Carbon black (parts by weight) | 60.0 | 60.0 | 60.0 | 60.0 | 60.0 | 60.0 |
| Filler (parts by weight) | | | | | | |
| Silica | | | | | | |
| Calcium carbonate | | | | | | |
| Clay | | | | | | |
| Mica | | | | | | |
| Talc | 15.0 | 20.0 | 150.0 | 200.0 | 20.0 | 20.0 |
| Paraffin oil (parts by weight) | 10.0 | 10.0 | 10.0 | 10.0 | 10.0 | 10.0 |
| Vulcanization system (parts by weight) | | | | | | |
| Zinc white (ZnO) | 3.0 | 3.0 | 3.0 | 3.0 | 3.0 | 3.0 |
| Stearic acid | 2.0 | 2.0 | 2.0 | 2.0 | 2.0 | 2.0 |
| Zinc stearate | | | | | | |
| Brominated alkylphenol resin | 3.0 | 3.0 | 3.0 | 3.0 | 3.0 | 3.0 |
| Mooney scorch test ML-5up (125° C.) | 20.8 | 21.0 | 21.7 | 22.3 | 22.1 | 19.3 |
| Compression set (%) | | | | | | |
| 120° C. × 70 hr | 42 | 43 | 45 | 48 | 45 | 40 |
| 150° C. × 70 hr | 64 | 64 | 66 | 69 | 66 | 60 |
| Modulus M100 (MPa) | 5.7 | 5.7 | 6.2 | 6.4 | 2.7 | 9.8 |
| Adhesiveness to yarns Peeling strength (N/25 min) | 77 | 75 | 70 | 69 | 66 | 60 |
| Impermeability (mg · mm/24 hr · cm$^2$) | | | | | | |
| Freon gas perrneation constant, 100° C. | 8.0 | 7.8 | 2.8 | 2.5 | 7.9 | 7.7 |
| Moisture permeation constant, 80° C. | 0.91 | 0.90 | 0.87 | 0.89 | 0.91 | 0.69 |

EX: Example, CE: Comparative Example

Examples 8 and 9 and Comparative Examples 5 and 13 to 18

These Examples and Comparative Examples are the examples for demonstrating the merits of including the inorganic laminar compound and the talc.

When Examples 8 and 9 and Comparative Examples 5 and 13 to 18 are compared, the compositions of Examples 8 and 9 are capable of sufficiently improving the gas impermeability of the hose since content of the clay or the mica added as the inorganic laminar compound is 25 parts by weight or higher. In contrast, the compositions of Comparative Example 5 wherein the composition is free from the filler and Comparative Examples 13 to 16 wherein the inorganic compound contained is not of laminar structure have proved to be incapable of improving the gas impermeability of the hose.

Comparative Examples 17 and 18 whose content of the clay or the mica added as the inorganic laminar compound is less than 25 parts by weight also proved to be incapable of improving the gas impermeability of the hose.

Examples 10 and 11 and Comparative Examples 3, 5, 19 and 20

These Examples and Comparative Examples are the examples for demonstrating the merits of adjusting the polymer composition of the BIMS.

Comparison of Examples 10 and 11, Comparative Example 5, and Comparative Examples 19 and 20 demonstrates that, in the case of BIMS containing 2.0% by weight of bromine, improvement in the gas impermeability is realized at the talc content of 15 parts by weight or higher, while equivalent improvement in the gas impermeability is realized at the talc content of 30 parts by weight or higher in the case of BIMS containing 1.2% by weight of bromine. Use of the talc for the laminar compound was also demonstrated to realize equivalent effects at a content lower than other organic laminar compounds. It is estimated that use of a BIMS with higher bromine content results in higher crosslinking density of the BIMS, and hence, in higher effects of preventing the refrigerant permeation.

Examples 10, 12 and 13 and Comparative Examples 21 to 23

These Examples and Comparative Examples are the examples for demonstrating the merits of including the talc in an appropriate amount.

Comparison of Examples 10, 12 and 13 with Comparative Example 21 demonstrates that talc content of less than 20 parts by weight is not effective in improving the refrigerant permeation of the hose since the talc content is too small.

Comparison of Examples 10, 12 and 13 with Comparative Example 23 demonstrates that talc content in excess of 200 parts by weight results in poor adaptability of the resulting composition for mixing and extrusion. Stable production of the hose from such composition is no longer realized and the resulting hose often suffer from voids and inconsistent gas impermeability.

Examples 14 to 18 and Comparative Example 24

These Examples and Comparative Examples are the examples for demonstrating the merits of including the zinc white, the brominated alkylphenol resin and the talc at once.

Examples 14 to 16 are the examples wherein content of the talc is altered, and Example 17 and 18 are the examples wherein composition of the BIMS is altered. These Examples wherein the content and the composition are altered within the scope of the invention are the most preferable Examples, and these Examples exhibit excellent compression set resistance and scorch resistance as well as sufficient gas impermeability. It should be noted that Comparative Example 24 whose talc content is less than 20 parts by weight is slightly insufficient in the gas impermeability.

Product Examples 1 and 2 and Comparative Product Examples 1 and 2

The rubber composition of Example 11 (and the rubber composition of Comparative Example 5 in the case of Comparative Product Example 1) was extruded onto a mandrel having a diameter of 14 mm from an extruder. The extruder was of the type adapted for a rubber use equipped with a cross-head die. The inner tube of the hose was thereby extruded to a thickness indicated in Table 3. A reinforcing yarn of polyester fibers was braided on the inner tube to form the reinforcing layer. The rubber composition shown in Table 3 was then extruded from an extruder equipped with a cross-head die adapted for rubber extrusion to form the outer cover of 1.2 mm thick. The resulting tube was then covered with a lead sheath with a lead press for steam vulcanization at 154° C. for 60 minutes. The lead sheath was then stripped off the vulcanized hose as it left the lead press and the mandrel was also removed to leave the hose.

The resulting hose was evaluated for gas impermeability, moisture impermeability, and vibration absorbability by the procedure as described below. The results are shown in Table 3.

(7) Freon gas impermeability

Of 4 hoses each having a length of 45 cm, 3 hoses were filled with a refrigerant (HFC 134a) to 0.6 g+0.1 g per 1 $cm^3$ of the hose volume. The remaining 1 hose was left unfilled. The hoses were sealed with plugs, and stored in an incubator at 80° C. for 96 hours. The hoses were weighed at every 24 hours. It was also confirmed that the inner pressure after 96 hours of the refrigerant-filled hoses was the saturated vapor pressure at the test temperature. The refrigerant permeation rate was calculated in terms of the weight loss (having the weight loss of the hose itself subtracted therefrom) in the time period from 24 hours to 96 hours.

$$D=[(B/S1)-(C/S2)]\times 100$$

wherein D is the refrigerant permeation rate [g/72 hr/m], B is the weight loss of the hose filled with the refrigerant from 24 to 96 hours [g], C is the weight loss of the hose filled with no refrigerant in 24 to 96 hours [g], S1 is the length of the hose filled with the refrigerant [m], and S2 is the length of the hose filled with no refrigerant [m].

The refrigerant permeation rate is preferably less than 4 g/72 hr/m.

3 hoses of 45 cm long were placed in an oven at 50° C. for 5 hours, and allowed cool. The hoses were filled with a desiccant molecular sieve 3A of the amount corresponding to 80% of the inner volume of the hose, and sealed. The hoses were then left in an atmosphere of 50° C. and 95% RH, and weight increase of the desiccant was measured at every 120 hours until 400 hours. The increase was divided the hose area and the period of 24 hours to calculate moisture permeation constant [$mg/cm^2/24$ hr] corresponding to the daily moisture permeation rate. The moisture permeation rate is preferably less than 1 $mg/cm^2/24$ hr.

2 hoses of 45 cm long were bent along an arc of predetermined radius of curvature to measure the force required for the bending. The radius of curvature was in the range of from 10 times the hose outer diameter (10 D) to three times the hose outer diameter (3 D). The force required for the bending was plotted in relation to the radius of curvature to read the bending force at the predetermined radium (4 D) for use as an index of the flexibility, and hence, vibration absorbability of the hose. The bending force is preferably less than 15 [N].

TABLE 3

|  |  | CPE 1 | CPE 2 | PE 1 | PE 2 |
|---|---|---|---|---|---|
| Inner tube | Rubber Composition | CE 5 | EX 11 | EX 11 | EX 11 |
|  | Br content (%) | 2.0 | 2.0 | 2.0 | 2.0 |
|  | Talc (parts by weight) | 0.0 | 30.0 | 30.0 | 30.0 |
|  | Thickness (mm) | 2.0 | 1.0 | 2.0 | 3.0 |
| Reinforcing layer | Material | Polyester yarn | Polyester yarn | Polyester yarn | Polyester yarn |

TABLE 3-continued

|  |  | CPE 1 | CPE 2 | PE 1 | PE 2 |
|---|---|---|---|---|---|
| Outer cover | Rubber composition | CE 5 | EX 11 | EX 11 | EX 11 |
|  | Thickness (mm) | 1.2 | 1.2 | 1.2 | 1.2 |
| Impermeability |  |  |  |  |  |
| Refrigerant permeation rate (g/72 hr/m) 80° C. |  | 4.0 | 4.0 | 3.0 | 2.5 |
| Moisture permeation rate (g/cm²/24 hr) 50° C. |  | 0.08 | 0.08 | 0.08 | 0.08 |
| Absorbability Bending strength (N) |  | 10 | 10 | 10 | 10 |

CPE: Comparative Product Example, PE: Product Example

Comparison between the Product Example 1 with Comparative Product Example 1 reveals that the hose produced by using the rubber composition of the present invention has excellent refrigerant permeation resistance as well as excellent vibration absorbing capacity.

Comparison between the Product Examples 1 and 2 with Comparative Product Example 1 reveals that the hose has excellent refrigerant permeation resistance as well as excellent vibration absorbing capacity when the thickness of the inner tube is at least 1.5 mm.

Product Examples 3 to 7

The rubber composition of Example 11 was extruded by in-die drawing method in an extruder equipped with a cross-head die onto a mandrel having a diameter of 14 mm to thereby form a hose inner tube having a thickness of 2.0 mm. The drawing ratio (a/b) of the cross-sectional area at the inlet of the cross-head die (a) to the cross-sectional area of the extrudate at the die outlet (b) was adjusted to the value shown in Table 4. The reinforcing layer and the outer cover were formed as in the case of Product Example 1. The results of the evaluation for the gas permeability, moisture impermeability, and vibration absorbability are shown in Table 4.

Figure 5:
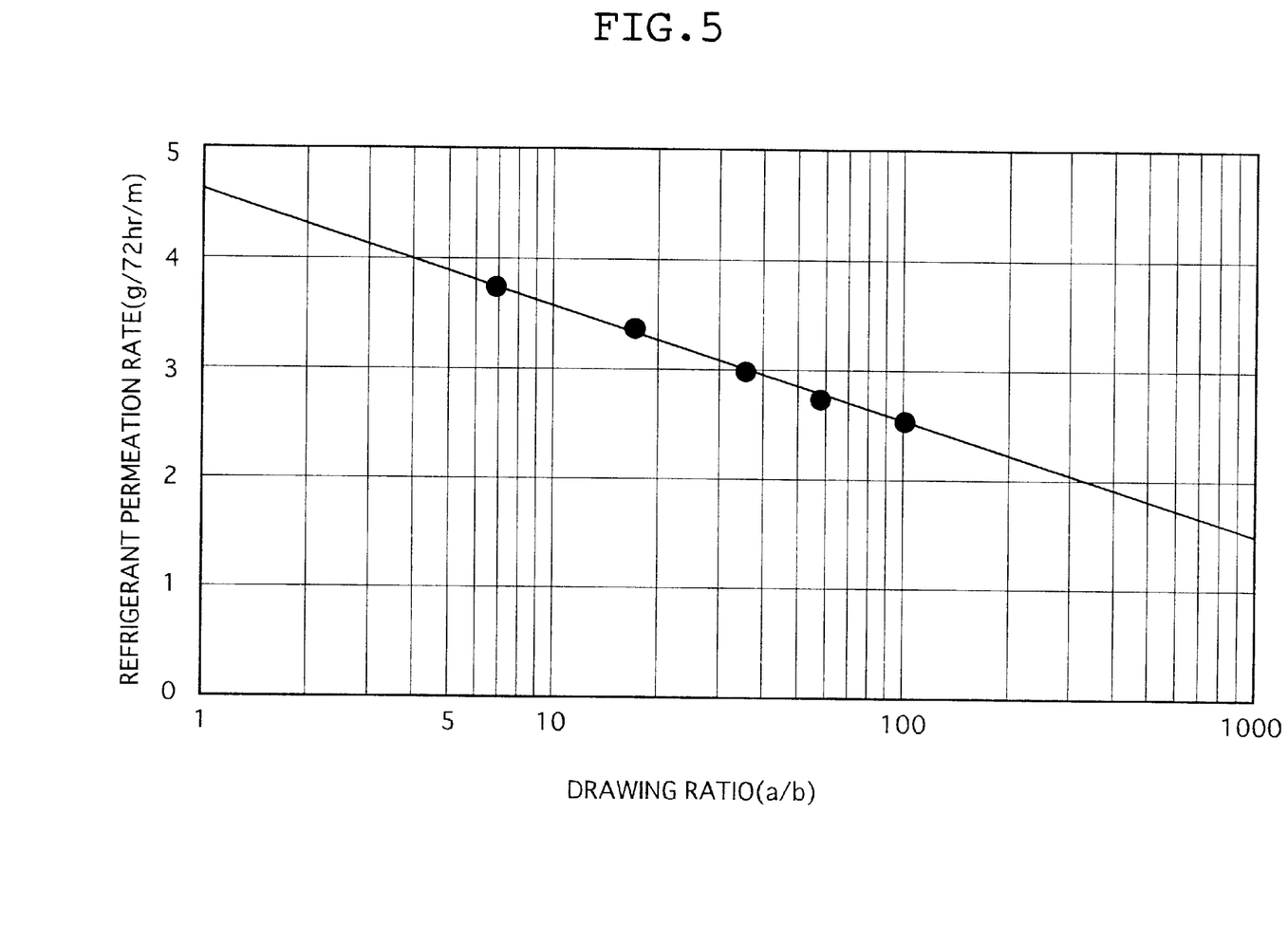
FIG. 5 is a graph showing refrigerant permeation rate of the refrigerant hose in relation to the drawing ratio in the cross-head die in the production of the refrigerant hose of the present invention.

FIG. 5 is a graph wherein the moisture permeation rate is plotted in relation to the drawing ratio within the cross-head die for the hoses obtained in Product Examples 3 to 7.

As shown in Table 4, refrigerant permeation rate reduces with the increase in the in-die drawing ratio. FIG. 5 allows the estimation that the drawing ratio of 5 or more is effective in improving the refrigerant permeation rate. The effect of improving the refrigerant permeation rate becomes saturated at the drawing ratio in excess of 100, and extrusion at such drawing ratio is substantially impossible due to unduly increased extrusion pressure and the like. The effective drawing ratio is 5 to 100, and preferably, 10 to 100. The results also reveal that the vibration absorbability is not substantially effected by the increase in the drawing ratio.

EFFECTS OF THE INVENTION

The rubber composition according to an aspect of the present invention has excellent compression set resistance simultaneously with sufficient scorch resistance to enable stable processing. This rubber composition also exhibits excellent moisture impermeability and excellent weatherability (ozone resistance). Another rubber composition of the present invention can be produced into a refrigerant hose having excellent moisture and freon gas impermeability as

TABLE 4

|  |  | PE 3 | PE 4 | PE 5 | PE 6 | PE 7 |
|---|---|---|---|---|---|---|
| Inner tube | Rubber Composition | EX 11 | EX 11 | EX 11 | EX 11 | EX 11 |
|  | Br content (%) | 2.0 | 2.0 | 2.0 | 2.0 | 2.0 |
|  | Talc (parts by weight) | 30.0 | 30.0 | 30.0 | 30.0 | 30.0 |
|  | Thickness (mm) | 2.0 | 2.0 | 2.0 | 2.0 | 2.0 |
| Reinforcing layer | Material | Polyester yarn | Polyester yarn | Polyester yarn | Polyester yarn | Polyester yarn |
| Outer cover | Rubber composition | EX 11 | EX 11 | EX 11 | EX 11 | EX 11 |
|  | Thickness (mm) | 1.2 | 1.2 | 1.2 | 1.2 | 1.2 |
| Extrusion conditions | Die diameter (mm) | 40 | 62 | 90 | 115 | 152 |
|  | Inner diameter of inner tube (mm) | 14 | 14 | 14 | 14 | 14 |
|  | Cross-sectional area at die inlet, a | 7.0 | 16.8 | 35.3 | 57.7 | 10.8 |
|  | Cross-sectional area of extrudate, b | 1.0 | 1.0 | 1.0 | 1.0 | 1.0 |
|  | Drawing ratio, a/b | 7 | 17 | 36 | 58 | 102 |
| Impermeability |  |  |  |  |  |  |
| Refrigerant permeation rate (g/72 hr/m) 80° C. |  | 3.8 | 3.4 | 3.0 | 2.8 | 2.6 |
| Moisture permeation rate (g/72 hr/m) 50° C. |  | 0.08 | 0.08 | 0.08 | 0.08 | 0.08 |
| Vibration absorbability Pending strength (N) |  | 10 | 10 | 10 | 10 | 10 |

CPE: Comparative Product Example, PE: Product Example well as sufficient vibration absorbability when such rubber composition is used for the inner tube of the refrigerant hose and the inner tube is produced by drawing extrusion by an extruder equipped with a cross-head die. Consequently, the hose produced by using the rubber composition of the present invention is quite adapted for use as a refrigerant hose, and also, as a radiator hose, hot water hose, steam hose, and the like.

What is claimed is:

1. A refrigerant hose comprising at least three layers of an inner tube, and outer cover, and a reinforcing layer between said inner tube and outer cover, said inner tube and/or outer cover of the hose being fabricated from a rubber composition comprising
    (A) 100 parts by weight of a brominated copolymer of a $C_{4-7}$ isomonoolefin and a p-alkylstyrene wherein p-alkylstyrene content is 5 to 25% by weight, bromine content is at least 1.5% by weight, and the weight ratio of bromine unit to p-alkylstyrene unit is such that 0.15<bromine/p-alkylstyrene<0.40;
    (B) 0.1 to 10 parts by weight of zinc white;
    (C) 1 to 15 parts by weight of brominated alkylphenol resin; and
    (D) 20 to 150 parts by weight of talc as an inorganic laminar compound wherein the hose has a refrigerant gas impermeability of less than 8.0 mg.mm/24 hr.cm$^2$ and has a compression set resistance of up to 50% after being subjected to 25% compression at 120° C. for 70 hours and a compression set resistance of up to 70% after being subjected to 25% compression at 150° C. for 70 hours.

2. A refrigerant hose comprising at least two layers of an inner tube and a reinforcing layer on the exterior of the inner tube, said inner tube of the hose being fabricated from a rubber composition comprising
    (A) 100 parts by weight of a brominated copolymer of a $C_{4-7}$ isomonoolefin and a p-alkylstyrene wherein p-alkylstyrene content is 5 to 25% by weight, bromine content is at least 1.5% by weight, and the weight ratio of bromine unit to p-alkylstyrene unit is such that 0.15<bromine/p-alkylstyrene<0.40;
    (B) 0.1 to 10 parts by weight of zinc white;
    (C) 1 to 15 parts by weight of brominated alkylphenol resin; and
    (D) 20 to 150 parts by weight of talc as an inorganic laminar compound wherein the hose has a refrigerant gas impermeability of less than 8.0 mg.mm/24 hr.cm$^2$ and has a compression set resistance of up to 50% after being subjected to 25% compression at 120° C. for 70 hours and a compression set resistance of up to 70% after being subjected to 25% compression at 150° C. for 70 hours.

3. A process for producing a refrigerant hose comprising at least two layers of an inner tube and a reinforcing layer on the exterior of the inner tube, wherein said inner tube is fabricated from a rubber composition comprising
    (A) 100 parts by weight of a brominated copolymer of a $C_{4-7}$ isomonoolefin and a p-alkylstyrene where p-alkylstyrene content is 5 to 25% by weight, bromine content is at least 1.5% by weight, and the weight ratio of bromine unit to p-alkylstyrene unit is such that 0.15<bromine/p-alkylstyrene<0.40;
    (B) 0.1 to 10 parts by weight of zinc white;
    (C) 1 to 15 parts by weight of brominated alkylphenol resin; and
    (D) 20 to 150 parts by weight to talc as an inorganic laminar compound wherein the hose has a refrigerant gas impermeability of less than 8.0 mg.mm/24 hr.cm$^2$ and has a compression set resistance of up to 50% after being subjected to 25% compression at 120° C. for 70 hours and a compression set resistance of up to 70% after being subjected to 25% compression at 150° C. for 70 hours;
    said inner tube being formed by an in-die drawing method wherein a drawing ratio (a/b) of the cross-sectional area at the die inlet (a) to the cross-sectional area of the extrudate at the die outlet (b) is at least 5.

* * * * *

UNITED STATES PATENT AND TRADEMARK OFFICE
CERTIFICATE OF CORRECTION

PATENT NO. : 6,548,585 B1
DATED : April 15, 2003
INVENTOR(S) : Osamu Ozawa et al.

It is certified that error appears in the above-identified patent and that said Letters Patent is hereby corrected as shown below:

<u>Column 24,</u>
Line 19, "where" should read -- wherein --.
Line 27, "talc" should read -- of talc --.

Signed and Sealed this

First Day of July, 2003

JAMES E. ROGAN
*Director of the United States Patent and Trademark Office*